(12) United States Patent
Park et al.

(10) Patent No.: US 11,958,504 B2
(45) Date of Patent: Apr. 16, 2024

(54) METHOD AND APPARATUS FOR CONTROLLING A VEHICLE'S DRIVING OPERATION USING ADVANCE INFORMATION

(71) Applicant: RideFlux Inc., Jeju-si (KR)

(72) Inventors: Junghee Park, Jeju-si (KR); Ho Yun, Jeju-si (KR); Sohyun Kim, Seoul (KR); Jiwoong Kim, Jeju-si (KR); Hawook Jeong, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 0 days.

(21) Appl. No.: 16/875,429

(22) Filed: May 15, 2020

(65) Prior Publication Data

US 2020/0361489 A1 Nov. 19, 2020

(30) Foreign Application Priority Data

May 15, 2019 (KR) ........................ 10-2019-0056859

(51) Int. Cl.
*B60W 60/00* (2020.01)
*B60W 10/04* (2006.01)
(Continued)

(52) U.S. Cl.
CPC ........ *B60W 60/0016* (2020.02); *B60W 10/04* (2013.01); *B60W 30/09* (2013.01);
(Continued)

(58) Field of Classification Search
CPC .... B60W 10/04; B60W 30/02; B60W 30/025; B60W 30/08; B60W 30/09; B60W 30/095; B60W 30/0953; B60W 30/0956; B60W 30/18163; B60W 30/182; B60W 50/14; B60W 50/082; B60W 50/10; B60W 60/0016; B60W 60/0015; B60W 60/0018;
(Continued)

(56) References Cited

U.S. PATENT DOCUMENTS 9,517,771 B2 * 12/2016 Attard ................. B60W 30/182
9,558,408 B2 * 1/2017 Martin ................... G08G 1/012
(Continued)

FOREIGN PATENT DOCUMENTS

JP 2017-211758 A 11/2017
JP 2018-077087 A 5/2018
(Continued)

*Primary Examiner* — Russell Frejd
*Assistant Examiner* — Brandon Z Willis
(74) *Attorney, Agent, or Firm* — Studebaker & Brackett PC (57) ABSTRACT

Provided is a method of controlling driving of a vehicle using advance information, the method including acquiring preset local information including a road name, a road section, a road attribute, a location of a building, a lane, a traffic signal, and obstacle information for a predetermined region, acquiring a driving experience value resulting from a previous drive using the local information, and setting a target speed corresponding to the road attribute using the driving experience value, determining a driving state and a driving speed of the vehicle on the basis of the local information, and the target speed, of a current position of the vehicle, and generating a driving control command corresponding to the driving state and the driving speed.

12 Claims, 7 Drawing Sheets

(51) Int. Cl.
*B60W 30/09* (2012.01)
*B60W 30/095* (2012.01)
*B60W 30/18* (2012.01)
*B60W 50/14* (2020.01)
*G01C 21/34* (2006.01)
*G01C 21/36* (2006.01)

(52) U.S. Cl.
CPC .... *B60W 30/0953* (2013.01); *B60W 30/0956* (2013.01); *B60W 30/18163* (2013.01); *B60W 50/14* (2013.01); *G01C 21/3407* (2013.01); *G01C 21/3453* (2013.01); *G01C 21/3691* (2013.01); *B60W 2520/10* (2013.01); *B60W 2552/10* (2020.02); *B60W 2552/45* (2020.02); *B60W 2552/53* (2020.02); *B60W 2555/60* (2020.02)

(58) Field of Classification Search
CPC ....... B60W 60/00184; B60W 60/0027; B60W 2520/10; B60W 2555/60; B60W 2552/53; B60W 2552/10; B60W 2552/45; B60W 2552/35; B60W 2554/20; B60W 2554/40; B60W 2554/60; G01C 21/3407; G01C 21/3453; G01C 21/3691
See application file for complete search history.

(56) References Cited

U.S. PATENT DOCUMENTS

| | | | |
|---|---|---|---|
| 9,946,260 B2* | 4/2018 | Shashua | G08G 1/096805 |
| 10,417,910 B2* | 9/2019 | Scofield | B60W 30/143 |
| 10,679,497 B1* | 6/2020 | Konrardy | G08G 1/096725 |
| 10,809,731 B2* | 10/2020 | Luo | G05D 1/0274 |
| 2018/0292822 A1* | 10/2018 | Ichikawa | G05D 1/0257 |
| 2018/0356830 A1* | 12/2018 | Haghighat | B60W 50/085 |
| 2019/0322276 A1* | 10/2019 | Narmack | B60W 40/09 |
| 2021/0237769 A1* | 8/2021 | Ostafew | G06K 9/00805 |
| 2022/0011127 A1* | 1/2022 | Lee | B60W 30/18145 |

FOREIGN PATENT DOCUMENTS

| | | |
|---|---|---|
| JP | 2018-136966 A | 8/2018 |
| JP | 2019-043495 A | 3/2019 |
| KR | 10-2015-0110713 A | 10/2015 |
| KR | 10-1695557 B1 | 1/2017 |
| KR | 10-2017-0015238 A | 2/2017 |
| KR | 10-2017-0077317 A | 7/2017 |
| KR | 10-2017-0133149 A | 12/2017 |
| KR | 10-2018-0094823 A | 8/2018 |

* cited by examiner

METHOD AND APPARATUS FOR CONTROLLING A VEHICLE'S DRIVING OPERATION USING ADVANCE INFORMATION

CROSS-REFERENCE TO RELATED APPLICATION

This application claims priority to and the benefit of Korean Patent Application No. 2019-0056859, filed on May 15, 2019, the disclosures of which are incorporated herein by reference in its entirety.

BACKGROUND

1. Field of the Invention

Embodiments are related to a method and apparatus for controlling driving of a vehicle using advance information, and more specifically, to performing fast and stable autonomous driving using a target speed previously determined according to an attribute of a road.

2. Discussion of Related Art

Autonomous driving vehicles refer to vehicles that recognize a surrounding environment without a driver's intervention and automatically drive by themselves to a given destination according to the recognized surrounding environment.

In the autonomous driving technology used in the conventional autonomous driving vehicle, a global route (a trajectory composed of location information) that is an optimal route to a destination is derived on a given map, and driving of the vehicle is controlled to operate along the derived global route.

In addition, in the case of a method of following a global route according to the conventional autonomous driving technique, when the global route needs to be corrected during driving of the vehicle, correcting the global route takes a great deal of processing time. In addition, it is structurally difficult to perform driving actions, such as lane changing, joining, and branching.

In addition, vehicle autonomous driving systems, unlike navigation systems provided in vehicles, require a detailed map at a lane level, and constructing the map is expensive. In addition, when a navigation algorithm of the existing vehicle is applied to the detailed map, calculating an initial route takes a great deal of time.

In addition, when the autonomous driving system cannot follow a planned route due to a road condition, and route recalculation is delayed, the vehicle may stop or move to an unplanned road, which may cause a dangerous situation.

In addition, in the case of emergence of an obstacle while driving, the existing driving control method for obstacle detection and avoidance through sensor detection has a difficulty in clearly identifying the characteristics of the obstacle, and a delay in reflecting a real-time sensing result, which cause difficulty in smooth driving.

RELATED ART DOCUMENT

Patent Document (Patent Document 1) Korean Laid-open Patent Publication No. 10-2018-0094823 (Aug. 24, 2018)

(Patent Document 2) Korean Registered Patent No. 10-1695557 (Jan. 5, 2017)

SUMMARY OF THE INVENTION

The present invention provides an autonomous driving method and apparatus for a vehicle that is capable of deriving the optimal route in a short time using preset local information in which road attribute information, user experience information, and the like are reflected.

The technical objectives of the present invention are not limited to the above, and other objectives may become apparent to those of ordinary skill in the art based on the following description.

According to the first embodiment of the present invention, there is provided a method of controlling driving of a vehicle using advance information, the method including: acquiring preset local information including a road name, a road section, a road attribute, a location of a building, a lane, a traffic signal, and obstacle information for a predetermined region; acquiring a driving experience value resulting from a previous drive using the local information, and setting a target speed corresponding to the road attribute using the driving experience value; determining a driving state and a driving speed of the vehicle on the basis of the local information, and the target speed, of a current position of the vehicle; and generating a driving control command corresponding to the driving state and the driving speed of the vehicle.

According to the second embodiment of the present invention, there is provided an apparatus for controlling driving of a vehicle using advance information, the apparatus including a processor and a memory storing instructions executable by the processor, wherein the processor executes the instructions to: acquire preset local information including a road name, a road section, a road attribute, a location of a building, a lane, a traffic signal, and obstacle information for a predetermined region; acquire a driving experience value resulting from a previous drive using the local information, and set a target speed corresponding to the road attribute using the driving experience value; determine a driving state and a driving speed of the vehicle on the basis of the local information, and the target speed, of a current position of the vehicle; and generate a driving control command corresponding to the driving state and the driving speed of the vehicle.

According to the third embodiment of the present invention, there is provided a non-transitory computer-readable storage medium configured to store instructions executable by a processor to execute a method of controlling driving of a vehicle using advance information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings so that those skilled in the art may easily carry out the present invention. The present invention may be embodied in various ways and is not to be construed as being limited to the embodiments set forth herein. In the drawings, parts irrelevant to the description have been omitted for the clarity of explanation, and the same reference numerals are used to designate the same elements through the whole specification.

Through the specification, the term "connected to" or "coupled to" used to designate a connection or coupling of one element to another element includes both a case in which the element is "directly connected to" or "directly coupled to" another element and a case in which the element is "electronically connected to" or "electronically coupled to" another element via still another element. The term "comprises" or "includes" and/or "comprising" or "including" means that one or more other components, steps, operation and/or existence or addition of elements are not excluded in addition to the described components, steps, operation and/or elements unless context dictates otherwise.

Hereinafter, the present invention will be described in detail with reference to the accompanying drawings.

In the following description, an apparatus 100 for controlling driving of a vehicle using advance information is referred to as a vehicle driving control apparatus 100 for brevity.

In the following description, a user refers to a person who uses the vehicle driving control apparatus 100 and may include a developer, a driver of a vehicle, a passenger, an owner, and the like, and may include all persons who directly or indirectly use the vehicle driving control apparatus 100.

Figure 1:
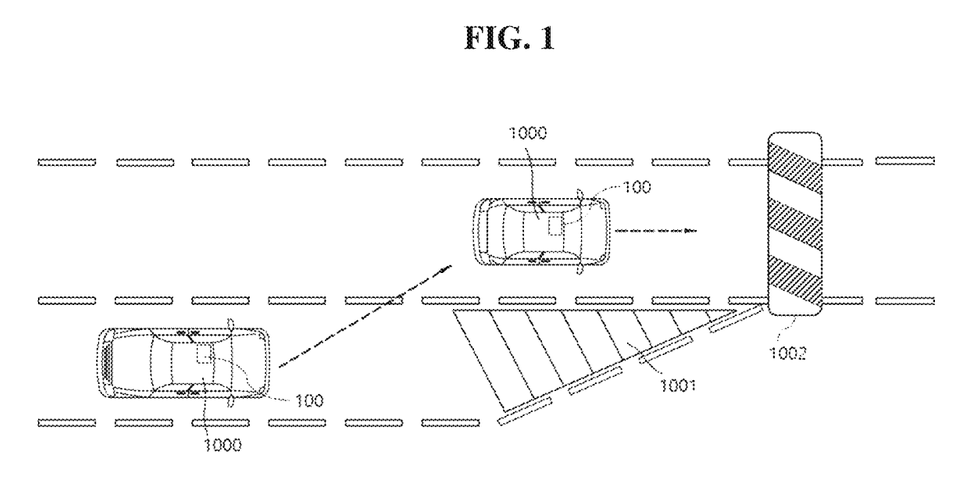
FIG. 1 is a view for schematically describing a method of controlling driving of a vehicle using advance information according to one disclosure.

FIG. 1 is a view for schematically describing a method of controlling driving of a vehicle using advance information according to one disclosure.

According to one disclosure, the vehicle driving control apparatus 100 may be installed inside or outside a vehicle 1000. In addition, the vehicle driving control apparatus 100 may be included in the vehicle 1000 as a part thereof and may be mounted as a component independent of the vehicle 1000. In addition, the vehicle driving control apparatus 100 may operate using parts included in the vehicle 1000.

According to one disclosure, the vehicle driving control apparatus 100 may obtain information required for autonomous driving by communicating with a camera, a driving device, a steering device, and a sensor unit installed in the vehicle 1000 or may control parts of the vehicle 1000 required for autonomous driving.

According to one disclosure, the vehicle driving control apparatus 100 may provide a method of efficiently performing autonomous driving in an already-known place by actively utilizing information collected in advance.

According to one disclosure, the vehicle driving control apparatus 100 may perform autonomous driving of the vehicle using pieces of information involved in a road, in particular, advance information related to road attributes. Accordingly, the vehicle driving control apparatus 100 may perform efficient autonomous driving while saving time by determining obstacles using sensors and determining road attributes using real time determination.

According to one disclosure, the road attribute include at least one of the number of lanes, a stop line, a crosswalk, a speed limit, an intersection, a U-turn, a road entry/exit point, a road junction, a road fork, a building access road, a speed bump, and a protected area of the road.

The road attributes shown in FIG. 1 include i) a section 1001 in which a two-lane road is narrowed to a one-lane road and ii) a speed bump 1002 installed on the first lane of the road.

Accordingly, the vehicle driving control apparatus 100 may be included in the vehicle 1000 driving in the second lane. According to one disclosure, the vehicle driving control apparatus 100 may acquire the section 1001 in which the two-lane road is narrowed to the one-lane road through advance map information (or preset local information). Accordingly, the vehicle driving control apparatus 100 may control the vehicle 1000 to move the vehicle 1000 in a direction toward the first lane. That is, since the vehicle driving control apparatus 100 already identifies the location of the section 1001 of the road in which the lanes are reduced, the vehicle driving control apparatus 100 obtains information about the current location of the vehicle 1000 and controls the vehicle 1000 to change lanes before appearance of the section 1001 of the road being narrowed. That is, the vehicle 1000 may save time for determining the attributes of the road and improve reliability regarding accurate determination.

Next, the vehicle driving control apparatus 100 may acquire information related to the speed bump 1002 while driving along the one-lane road. The vehicle driving control apparatus 100 may identify the location of the speed bump 1002 using pre-trained driving information. In addition, the vehicle driving control apparatus 100 may acquire information about riding comfort when passing through the speed bump 1002 through pre-training. For example, the information about riding comfort represents an optimal riding comfort state determined by analyzing pieces of information about riding comfort of the user or vibration data when the vehicle 1000 passes the speed bump 1002 at different speeds. For example, in order to pass through the speed bump 1002 in the shortest time, driving at a speed close to the allowed speed limit on the road is desired, but in order to provide the driver with better riding comfort, driving at a speed below the speed limit or driving after stopping for a while is desired. That is, the vehicle driving control apparatus 100 may provide an autonomous driving method customized for each road attribute by reflecting a driving experience value of the user.

In more detail, with regard to local information previously set according to a disclosed embodiment, not only general road information is used, but also the influence of the road information on driving and an ideal action to cope with the road information are analyzed and evaluated in advance and the result is stored and utilized together with map information. The analysis and evaluation may be conducted based on experts or social consensus as needed and are not limited to a particular form.

For example, the local information may not only include a target speed, which refers to an optimal speed at each point, but may also include information about a desirable route to be traveled on by the vehicle in practice.

For example, driving on the center of a lane is generally desirable, but this is not the case at all times. For example, when a lane is not directly marked on the road, such as when turning at an intersection, the local information is used to determine a desired route to be traveled by the vehicle.

In addition, information indicating whether a turn signal lamp is turned on/off according to a driving state of the vehicle in each location, a desired lane change route, traffic light related information, information on driving suitability (or the score for the driving state) according to the position, direction, and speed of the vehicle may be stored in advance in the local information. For example, driving in reverse and stopping in a crosswalk and an intersection are undesirable, and information corresponding thereto may be stored in advance in local information together with map information.

In addition, information about the probability of a pedestrian being present at each location may be stored in advance in the local information. For example, when a vehicle is driving on an expressway, there is a very low probability that pedestrians are present on the expressway, and when the probability is identified in advance, false positives and false negatives may be reduced.

In addition, the information about the probability of an animal being present at each location may be stored in advance in the local information. For example, information about a location having a high probability and a low probability of animal emergence may be obtained through actual data and stored in advance for utilization. In detail, the probability of an animal emerging in a center of a town may be low, and the probability of an animal emerging on a mountain road may be high.

In addition, information about the probability of a cultivator, a truck, a motorcycle, a bicycle, and the like being present at each location is calculated and stored in advance, and when the object is recognized, the recognition result is corrected on the basis of the previously stored probability of presence so that false positives and false negatives may be prevented.

In addition, fusion-related advance information according to a region may be stored in the local information. For example, autonomous vehicles use combinations of multiple sensors (image sensors, LiDARs), radars, global Navigation Satellite Systems (GNSSs), and the like).

In this case, a desired method of fusing one or more sensors may be different depending on the characteristics of the actual region. For example, in brief, the fusion method may include information about which sensor information needs to be weighted and which is more reliable when different pieces of information are given.

The reliabilities of different sensors are often changed according to characteristics of regions. For example, the GNSS is favorable on expressways without tall buildings, but the performance thereof is lowered in a downtown area with many tall buildings. As another example, the performance of the radar is lowered in the presence of a guardrail. In addition, the performance of the LiDAR is lowered in the presence of flashing indicators installed along a road to increase the visibility of the driver at a construction site at night.

The above examples represent information obtained while the vehicle is actually driving on the region. When the information is stored as advance information and used to determine the type of a sensor to be used at each location and the fusion method, the performance of autonomous driving may be further improved.

In the above-described embodiment, a computer may collect information constituting the local information through test driving on a road in a predetermined region. In addition, the computer may generate and store the local information on the basis of the collected information.

In one embodiment, the computer may generate and store the local information in consideration of the collected information together with information about a vehicle that has performed test driving. In addition, the computer may generate the local information by collecting information resulting from the test driving for each vehicle type and may newly generate or adjust local information for each type of vehicle based on specification information of the vehicle having performed the test driving in consideration of specifications of other types of vehicles.

In one embodiment, the computer collects information about roads and transportation facilities in the predetermined region during a test driving, collects information about obstacles in the predetermined region, and collects information about moving objects in the predetermined region, but the present invention is not limited thereto.

In the embodiment, the transportation facilities may include various facilities, such as pedestrian crosswalks, speed bumps, traffic lights, traffic signs, and the like, and the moving objects may be understood as inclusively referring to a mobile object, such as a pedestrian or other vehicle.

In addition, the computer may collect all types of local information that assist autonomous driving and information constituting the same according to a disclosed embodiment through test driving, and the present invention is not limited thereto.

Figure 2:
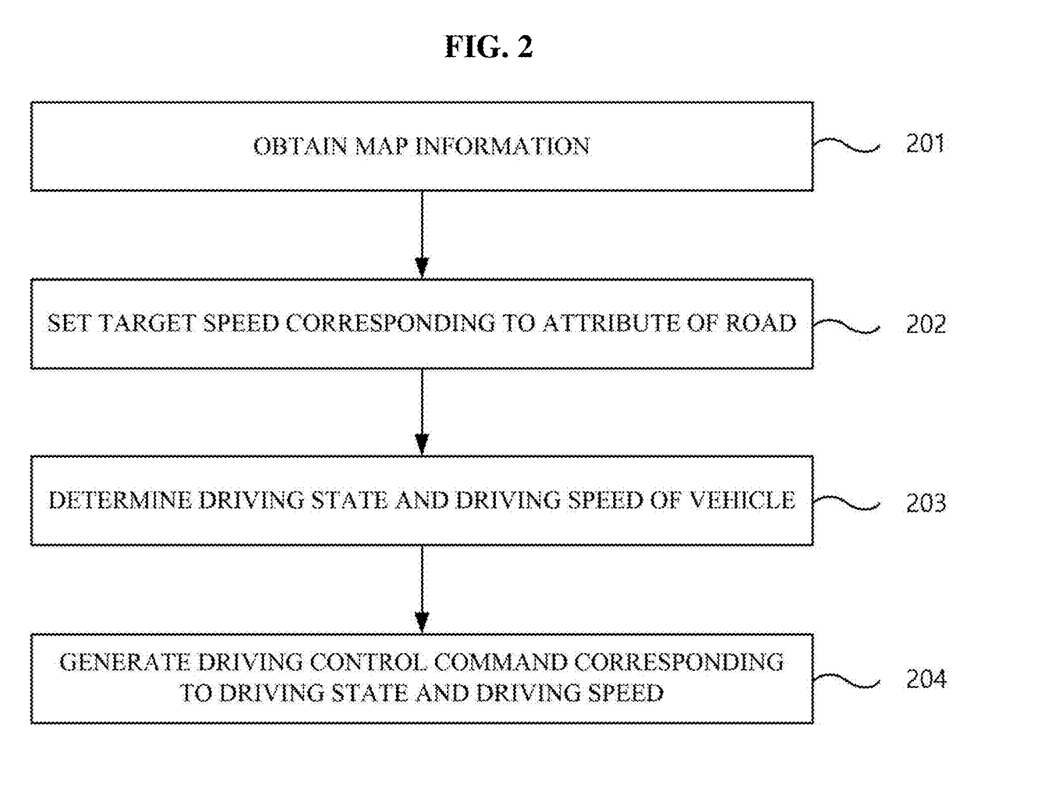
FIG. 2 is a flowchart for describing a method of controlling driving of a vehicle using advance information according to one disclosure.

FIG. 2 is a flowchart for describing a method of controlling driving of a vehicle using advance information according to one disclosure.

In block 201 according to one disclosure, the vehicle driving control apparatus 100 may obtain map information including information about a road name, a road section, a road attribute, a location of a building, a lane, a traffic signal, and an obstacle for a predetermined region.

In addition, the map information may include information about a pavement state of a road, the location and size of a school zone, a construction site, a barrier, a parking lot, a split road, a roundabout, an intersection, a passenger, crosswalk, and the like of the road.

According to one disclosure, the vehicle driving control apparatus 100 may receive the map information from an external server, receive the map information stored in the vehicle, or receive the map information from another user terminal. In addition, the vehicle driving control apparatus 100 may update the map information using a route traveled through the map information.

In addition, according to one disclosure, the vehicle driving control apparatus 100 may receive a driving image by communicating with a camera installed in the vehicle through a predetermined network. For example, the driving image may be a black box image of the vehicle or may be an image received from a stereo camera of the vehicle. In one embodiment, the vehicle driving control apparatus 100 may include a camera to acquire a driving image from the camera included in the vehicle driving control apparatus 100. In addition, it should be understood that the camera installed on the vehicle may be a camera installed on the front, side, or rear of the vehicle and may be installed anywhere on the vehicle.

The driving image may include a series of still images. Each of the still images may refer to a picture or a frame.

According to one disclosure, the vehicle driving control apparatus 100 may recognize an object from a driving image acquired during driving. The vehicle driving control apparatus 100 may recognize characteristics of the object from a frame of the image. For example, the vehicle driving control apparatus 100 may determine whether the object is a person or a thing and whether the object is moving or stationary, and when the object is a person, may determine a gender, an age, a disability, a moving speed, and a moving direction of the object.

In one embodiment, the vehicle driving control apparatus 100 may detect one or more objects from one frame included in the driving image. The one or more objects detected from one frame may be detected from another frame included in the same driving image. Alternatively, the one or more objects detected from one frame may not be detected from another frame included in the same driving image. For example, a roadway, a sidewalk, a first vehicle, a second vehicle, a third vehicle, and a traffic sign are detected in a first frame, while only the roadway, the sidewalk, the first vehicle, and the third vehicle may be detected in a second frame in the same video sequence and the second vehicle and the traffic sign may not be detected. In addition, in the second frame, a motorcycle that is not detected in the first frame may be detected.

According to one disclosure, the vehicle driving control apparatus 100 may obtain position information of an object using coordinate information of the object. For example, from the coordinate information of the first vehicle in the first frame, the position of the first vehicle on the frame may be identified. In addition, the distance between the first vehicle and the third vehicle may be recognized using the position of the first vehicle and the position of the third vehicle in the first frame. In addition, the amount of change in the distance between the first vehicle and the third vehicle in a third frame may be recognized using the position of the first vehicle and the position of the third vehicle in the third frame.

According to one disclosure, the vehicle driving control apparatus 100 may determine the type of the object and determine whether the object is noise on the basis of size information allowed for the type of the object at the position where the object is recognized. According to one disclosure, the size information allowable for the type of the object may refer to size information set based on a predetermined form by the type of the object.

In one embodiment, the vehicle driving control apparatus 100 may determine the type of object. For example, the type of object may be a roadway, a sidewalk, a building, a wall, a fence, a pole, a traffic light, a traffic sign, vegetation, terrain, the sky, a person, a rider, a vehicle, a truck, a bus, a train, a motorcycle, and a bicycle.

For example, the vehicle driving control apparatus 100 may detect a plurality of objects from one frame and determine the type of each of the plurality of objects. In addition, the vehicle driving control apparatus 100 may distinguish objects of the same type from each other among the plurality of objects. For example, when three vehicles are detected in one frame, the vehicle driving control apparatus 100 may distinguish the three vehicles into a first vehicle, a second vehicle, and a third vehicle.

In one embodiment, the vehicle driving control apparatus 100 may determine the position of an object in frame with respect to one frame. For example, the vehicle driving control apparatus 100 may determine the position of the object in frame with respect to another frame. In addition, for example, the vehicle driving control apparatus 100 may determine the positions of a plurality of objects in frame with respect to one frame. For example, the vehicle driving control apparatus 100 may determine the positions of the plurality of objects in frame with respect to another frame. Accordingly, the vehicle driving control apparatus 100 may determine coordinates of locations of a plurality of objects within a frame. According to one disclosure, the coordinates refer to coordinates (x, y), and the position value of the object may be output as a matrix value.

In one embodiment, the vehicle driving control apparatus 100 may determine the positions of the objects in units of pixels. For example, the vehicle driving control apparatus 100 may determine pixels representing an object from among pixels constituting a frame. For example, when one frame includes a plurality of objects, the vehicle driving control apparatus 100 may determine pixels representing each of the plurality of objects.

A method of precisely obtaining position information of an object in units of pixels rather than in units of bounding boxes by the vehicle driving control apparatus 100 may be applied to a technical field that requires accurate cognitive function. For example, the vehicle driving control apparatus 100 may acquire pieces of position information of an object in units of pixels so that the time-series position change of the object is analyzed and used for autonomous driving technology that requires fast and accurate cognitive functions.

In block 202 according to one disclosure, the vehicle driving control apparatus 100 may obtain a driving experience value resulting from a previous drive using the map information and set a target speed corresponding to an attribute of the road from the driving experience value.

According to one disclosure, the attribute of the road may include at least one of the number of lanes, a stop line, a crosswalk, a speed limit, an intersection, a U-turn, a road entry/exit point, a road junction, a road fork, a building access road, a speed bump, and a protected area of the road.

The driving experience value according to one disclosure may be a user experience value obtained from a drive in a predetermined region using a vehicle including the vehicle driving control apparatus 100 or an experience value obtained by the vehicle driving control apparatus 100. For example, the driving experience value may include information about driving comfort, driving time, driving efficiency, and the like obtained while driving in the same region multiple times at different speeds.

According to one disclosure, the driving experience value may vary according to the driver's tendency, age, gender, occupation, and the like, and thus the vehicle driving control apparatus 100 may obtain a driving experience value in which various driver's tendencies are reflected and may further perform learning.

The target speed may be an optimal speed determined using safety driving information and driver comfort information obtained by adjusting the speed of the vehicle in a stepwise manner according to the attributes of the road while driving on the road in the predetermined region. The target speed may be individually determined according to the attributes of the road and may be changed according to the duration of driving, the personal attribute of the user, and the physical attribute of the vehicle within a predetermined range of target speeds.

For example, the target speed may be adjusted on the basis of safety driving information that is obtained based on collected information about events (e.g., a risk of an accident, and the like) occurring while driving on a road in a predetermined region. For example, when it is determined that driving slower than the speed limit in a certain region is desirable for safe driving, the target speed may be set lower.

For example, the target speed may be obtained during driving on a road in a predetermined region by sensing vibration data while adjusting the speed of the vehicle according to an attribute of the road, analyzing the correlation between the vibration data and a riding comfort of the driver, and determining the optimum speed corresponding to the attribute of the road.

According to one disclosure, a vibration having the same strength in all frequency bands may be recognized by a driver or passenger as a different intensity of vibration according to the frequency band. Accordingly, when riding comfort of a vehicle is analyzed, the strength of vibration converted to the frequency perceivable by the driver or passenger is more important than the physical strength of vibration. Accordingly, the vehicle driving control apparatus 100 may check a reaction of the driver on the basis of the sensed data or determine the speed at which a vibration frequency allowing the driver to feel stable is output according to previously registered information.

According to one disclosure, the vehicle driving control apparatus 100 may control the driving of the vehicle by a standard path network (SPN). The SPN determines an ideal driving method in advance for a case in which other vehicles and other people are absent on a road and determines pieces of detailed information about a driving route, a driving speed, a lane, whether to change a lane, and turning a turn signal lamp on according to a situation.

The target speed determined by the SPN is the most stable and efficient driving speed according to a road attribute and may be information determined by driving on a road in a previously acquired region multiple times, and it should be understood that the target speed may be updated as the map information is updated. In addition, the target speed may vary depending on attributes of the driver and attributes of the vehicle. In addition, the target speed is not the current speed but a speed serving as a reference for determining the optimal speed for driving.

In block 203 according to one disclosure, the vehicle driving control apparatus 100 may determine a driving state and a driving speed of the vehicle on the basis of the map information and the target speed at the current position of the vehicle.

According to one disclosure, the vehicle driving control apparatus 100 has a benefit of determining a driving direction and a driving speed of the vehicle using pre-trained map information even when the destination of the vehicle is not set. For example, an error may occur in autonomous driving of the vehicle when information about a destination is not input. In this case, the present invention may control the vehicle to maintain autonomous driving using a target speed set according to the road attribute on the basis of a driving state of the vehicle set by default according to the road attribute. For example, when the vehicle without destination information is currently located at a road A, and the default driving state, that is, the basic driving state of the road A is driving straight, the vehicle driving control apparatus 100 may control the vehicle to be in a straight driving state.

According to one disclosure, the driving state of the vehicle is determined by the SPN driving method, and the driving state of the vehicle may include a main driving state and a lane change driving state.

According to one disclosure, the main driving state is to set to a default allowing the vehicle to drive without a specific driving command. Here, the default value corresponds to a basic driving state and may be differently set according to the road attribute. For example, a basic driving state at an intersection and a basic driving state on a straight road may be set differently.

When the vehicle driving control apparatus 100 does not receive a destination, and thus a time gap occurs due to a system error, or a time gap occurs in the process of generating a driving control command, the driving state of the vehicle is determined as a basic driving state, that is, a default value.

In one embodiment, the basic driving state may include information about a basic driving lane for each road in a predetermined region for a case when the destination of the vehicle is not set. For example, the basic driving state may include information indicating that the second lane is used as a basic driving lane on a specific road, but the present invention is not limited thereto.

In addition, the basic driving state may further include information about a basic driving direction for a basic driving lane of each road or for lanes of each road. For example, the basic driving state may include information for selecting one of straight driving, left-turn driving, and right-turn driving as a basic driving state in each lane. The basic driving state may be set differently depending on the lane traveled on by the vehicle. For example, when the lane traveled on by the vehicle is a straight lane, the basic driving state may be set as a straight drive. As another example, when the lane traveled on by the vehicle allows driving in two or more directions (e.g., a straight and left-turn lane, or a straight and right-turn lane), the basic driving state may include information for selecting one of the two directions.

For example, when the basic driving state in a straight and left-turn lane on position A is a left turn, the basic driving state is left-turn driving, and the vehicle driving control apparatus 100 may control the vehicle to turn left in the straight and left-turn lane at the position A without receiving a separate control command or having a destination.

In the case of a straight driving lane included in a driving route, straight driving is the basic driving state, and in the case of a straight and left-turn lane and a straight and right-turn lane, driving in one of the two directions may be the basic driving state. Thus, in the absence of a specific instruction, a new obstacle, or an added control command, the vehicle is caused to drive in the basic driving state that is originally set. That is, since the information about the lanes located in the region according to the map information is stored in advance, the vehicle driving control apparatus 100 drives on the basis of the basic driving state value without a separate instruction.

In block 204 according to one disclosure, the vehicle driving control apparatus 100 may generate a driving control command corresponding to the driving route of the vehicle.

According to one disclosure, the vehicle driving control apparatus 100 may transmit the generated driving control command to a steering unit, a driving unit, and a control unit of the vehicle to control the driving of the vehicle.

Figure 3:
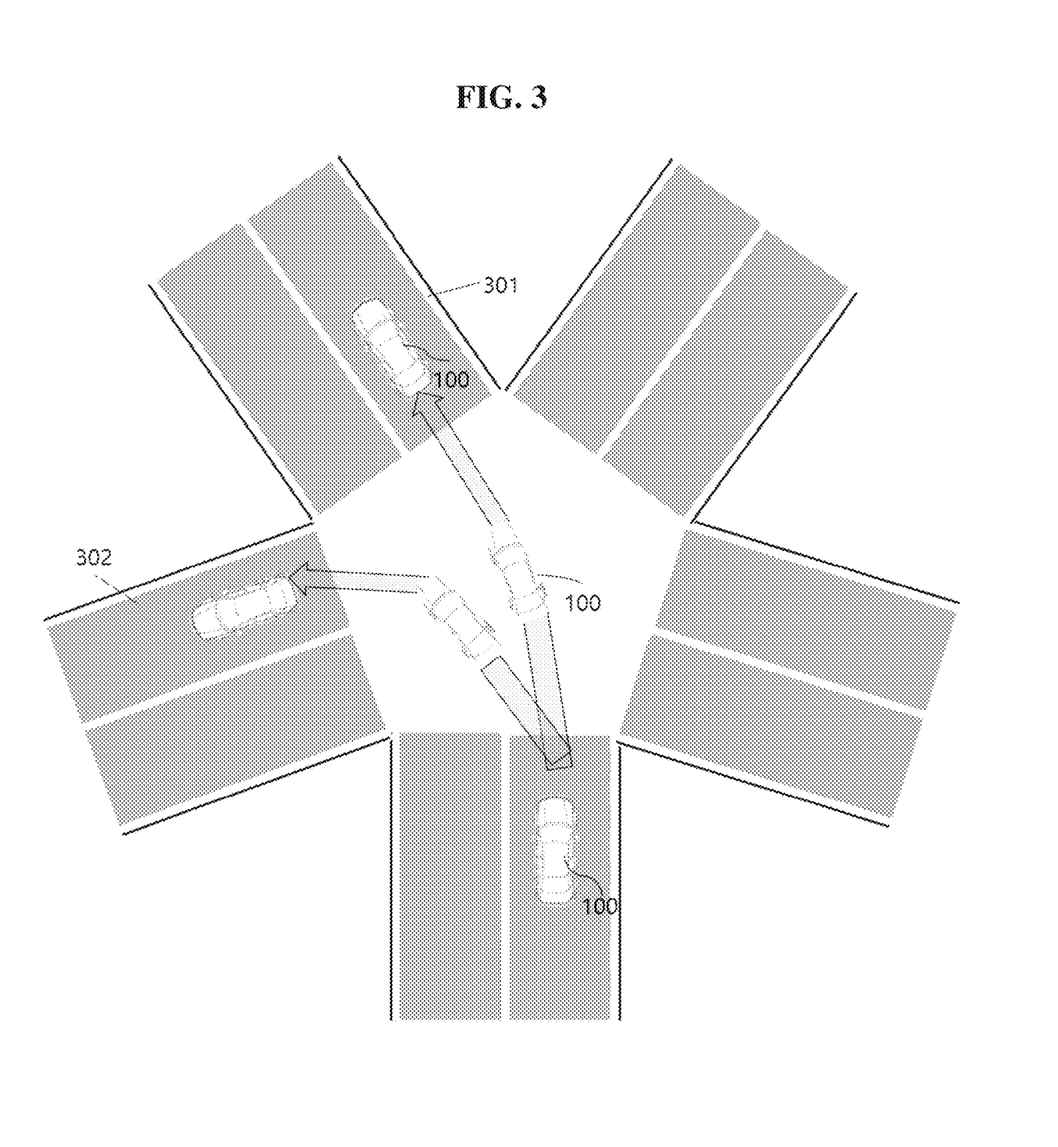
FIG. 3 is a view for describing a specific example of driving control being performed using advance information according to one disclosure.

FIG. 3 is a view for describing a specific example of driving control being performed using advance information according to one disclosure.

According to one disclosure, the vehicle driving control apparatus 100 may generate a driving route on the basis of pre-trained road information, and in the driving route, a driving state and a driving speed reflecting the attribute of the road may be set.

FIG. 3 illustrates an example of the vehicle driving control apparatus 100 moving the vehicle along the driving route according to one disclosure, in which the attribute of the road is a five-way intersection.

Accordingly, when using a first road 301 recognized as the straight direction in the five-way intersection, the vehicle driving control apparatus 100 may control the vehicle to drive toward the first road 301 and may set an appropriate driving speed to prevent congestion with other vehicles at the intersection and further determine whether to turn on the turn signal lamp.

In addition, when using a second road 302 recognized as a left direction in the five-way intersection, the vehicle driving control apparatus 100 may control the vehicle to travel toward the second road 302 and may determine an appropriate driving speed and whether to turn on the turn signal lamp.

When turning left or right at a general intersection, it is a social promise to inform a direction for the vehicle to proceed by turning the turn signal lamp on. However, in the case of a 5-way intersection, when the vehicle turns at a certain degree but the rotation is recognized as a straight direction, turning a turn signal lamp on is not necessary. In this case, turning a turn signal lamp on may increase confusion of other drivers.

Accordingly, the vehicle driving control apparatus 100 sets the driving route not to turn the turn signal lamp on when driving toward the first road 301 recognized as a straight direction in the five-way intersection through the map information and sets the driving route to turn the left turn signal lamp on when driving toward the second road 302 before turning left.

Such operations may be determined and performed on the basis of a previously stored database for the corresponding road.

Figure 4:
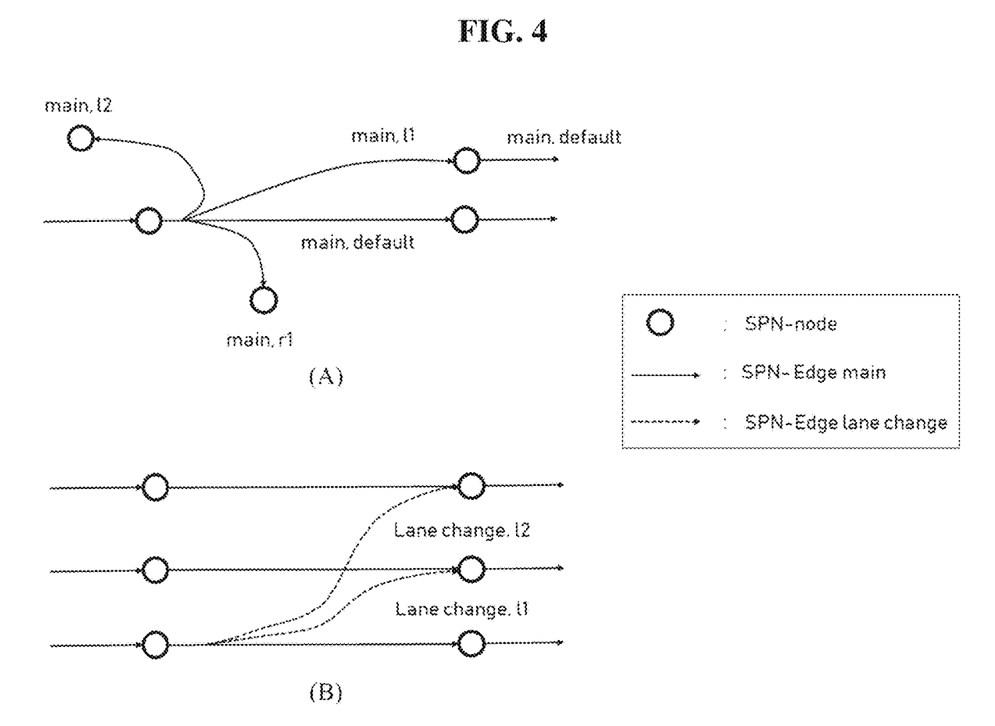
FIG. 4 is a view for describing a feature for controlling the driving of the vehicle using a driving state of the vehicle according to one disclosure.

FIG. 4 is a view for describing a feature for controlling the driving of the vehicle using a driving state of the vehicle according to one disclosure.

FIG. 4 illustrates for describing an autonomous driving method using an SPN method according to one disclosure. An SPN-node indicates the location of the vehicle and, furthermore, may indicate the location to which the vehicle is movable. An SPN-Edge main indicates a basic driving state that is determined according to a driving route, in which the driving of the vehicle is controlled by a main driving state included in an initially set driving route when there is no new added control command. An SPN-Edge lane change indicates a driving state in which lane change is performed when needed, and the original route is resumed.

According to one disclosure, an SPN-Edge main is a driving mode that is set by determining a driving route of a vehicle according to advance information acquired from map information. That is, the SPN-Edge main refers to a driving state determined according to the original route, such as performing straight driving, left-turn driving, or right-turn driving as needed.

For example, as in FIG. 4A, when the basic driving is set to straight driving, "main, default" indicates that the vehicle continues to drive straight, and "main, l1" indicates that the vehicle moves through a left turn driving on the driving route, and then "main, default" indicates that the vehicle continue to drive straight. In addition, when the straight driving is the basic driving, the left turn may be denoted by l1 and the right turn may be denoted by r1.

When the left turn driving is set as the basic driving, the straight driving may be determined as r1. That is, the basic driving state set for each road by default is determined as the driving state of the vehicle first, and when a control command to request a sub-driving state is generated according to the driving route, or when a sub-driving state needs to be inevitably performed, the driving state information may be changed.

Referring to FIG. 4B, "lane change, l1" indicates a driving state in which the vehicle moves one lane to the left, and "lane change, l2" indicates a driving state in which the vehicle moves two lanes to the left. The lane change driving state according to one disclosure may be selected by destination information, a control input of a user, and an autonomous driving control command according to a situation. For example, the vehicle without the vehicle driving control apparatus 100 receiving the destination information is traveling in a straight driving state, which is the basic driving state, on road A, and when a lane change is required due to a vehicle accident, the vehicle driving control apparatus 100 converts the driving state of the vehicle to a lane change driving state to generate a driving control command to avoid the vehicle accident.

Figure 5:
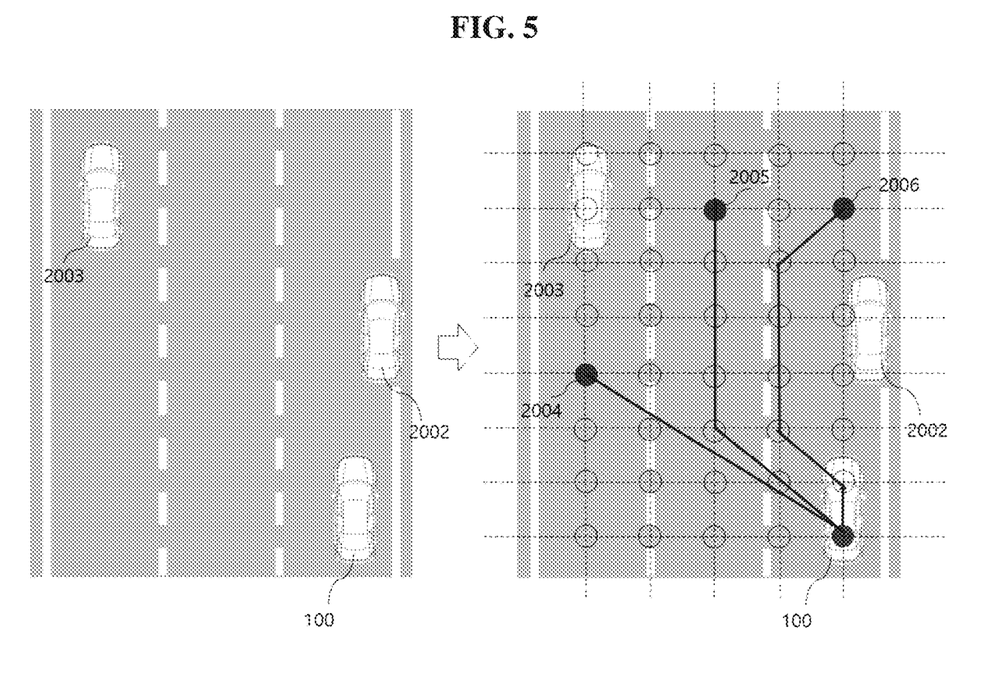
FIG. 5 is a view for describing a feature for generating a driving route of a vehicle by dividing a lane into grids according to one disclosure.

FIG. 5 is a view for describing a feature for generating a driving route of a vehicle by dividing a lane in grids according to one disclosure.

According to one disclosure, the vehicle driving control apparatus 100 of the present invention may perform autonomous driving on a vehicle using a dense path network (DPN) method together with an SPN. The DPN is a method of setting a route in more detail than in the SPN and allows autonomous driving to be more effectively performed using a grid map that shows the location to which the vehicle may be moveable and new obstacles located around the vehicle on the basis of the current location of the vehicle.

Specifically, the DPN is set to handle an area that is subdivided at a greater degree than that of the SPN and set to control the driving of the vehicle in more detail to cope with a variety of emergencies (e.g., a vehicle parked or stopped on a shoulder or a construction section) according to movement of objects and nearby vehicles around the vehicle.

In FIG. 5, the left drawing shows a vehicle including the vehicle driving control apparatus 100, a vehicle 2002 parked on the shoulder, and another vehicle 2003 driving two lanes away from the vehicle including the vehicle driving control apparatus 100 to the left.

According to one disclosure, the vehicle driving control apparatus 100 having an original driving route for continuously driving in the straight direction may recognize the parked vehicle 2002 as a new obstacle that has not been acquired from the map information. Accordingly, the vehicle driving control apparatus 100 needs to determine a new driving route for avoiding the parked vehicle 2002, which is a new obstacle. In this case, a method of avoiding the parked vehicle 2002 may include a method of moving to the next lane or moving aside by half of the original lane and then returning to the original lane.

In this case, the vehicle driving control apparatus 100 may generate a grid map indicating a location to which the vehicle is movable on the basis of the central axis of the rear wheel of the vehicle. In this case, the center for indicating the movable position of the vehicle is arbitrarily determined, and any part of the vehicle may be used as the central axis.

The vehicle driving control apparatus 100 may express the location to which the vehicle is movable on the grid map as a plurality of nodes and newly generate a plurality of routes to drive while avoiding the parked vehicle 2002 by connecting the nodes. In this case, the vehicle driving control apparatus 100 may select one of a first route 2004 in which the vehicle may move two lanes to the leftmost lane, a second route 2005 in which the vehicle may move one lane leftward to the middle lane, or a third route 2006 in which the vehicle may move aside by half of the original lane and then return to the original lane.

In this case, the vehicle driving control apparatus 100 may select a driving route most similar to the original driving route and move. For example, when the original driving route has been set to turn right at the next intersection using the rightmost lane, it is efficient to continue moving with the third route 2006.

As described above, a route in which the vehicle is movable at each location is generated in advance on the basis of the grid map, for example, a route for a predetermined distance from a first point is generated in advance, and the vehicle is moved according to the corresponding route, and at the end point of the corresponding route or at a location within a predetermined range of the end point, the vehicle is moved by reobtaining information about the next route (i.e., previously generated route information), thereby preventing an unnatural driving state that may occur in movement according to real-time determination.

Figure 6:
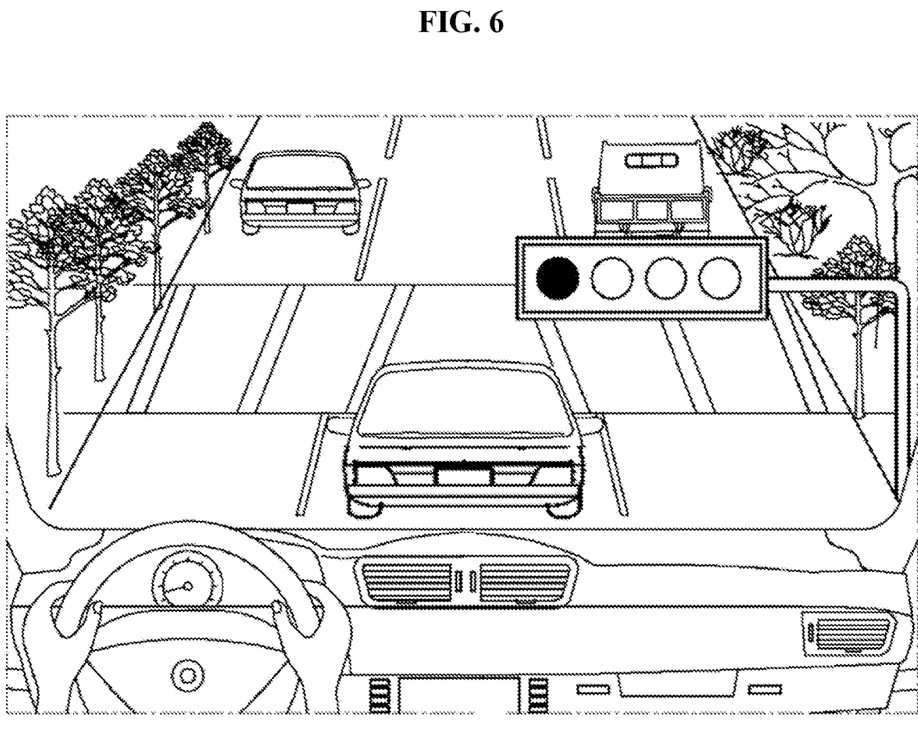
FIG. 6 is a view for describing an example of autonomous driving of a vehicle being performed using traffic signal information according to one disclosure.

FIG. 6 is a view for describing an example of autonomous driving of a vehicle being performed using traffic signal information according to one disclosure.

According to one disclosure, the vehicle driving control apparatus 100 may perform autonomous driving using a static collision map (SCM), a static tolerance map (STM), and a traffic signal map (TSM) in addition to an SPN and a DPN.

The TSM uses traffic light information related to the number, status, location, shape and operation method of traffic lights installed in a predetermined region to determine the driving state and the driving speed of the vehicle using the traffic light information obtained from the current location of the vehicle.

In detail, the TSM may further include information about whether a traffic light is present in the path of the vehicle, which position needs to be specifically recognized through an image to check the signal value when a traffic light is present, or which ID signal value needs to be viewed in vehicle to everything (V2X).

In addition, the TSM includes information about which signal is followed by which signal to reduce the recognition error, the maximum duration of yellow light, which crosswalk pedestrian signal produces which driving signal, and the like, so that information stored in the TSM may be configured to be used as an alternative, even when a field of view is not secured with an actual required traffic light.

The SCM determines the driving state and the driving speed of the vehicle using information about obstacles fixed to the road. Using the SCM, the vehicle driving control apparatus 100 obtains coordinate information (x, y, θ) of the current position and driving direction of the vehicle, and on the basis of the coordinate information (x, y, θ), determines the chance of collision with the obstacle acquired from the map information. In this case, the chance of collision may be expressed as a probability (%). The vehicle driving control apparatus 100 may determine a safety event when it is determined that the vehicle may avoid collision with the obstacle, and determine a collision event when it is determined that the vehicle may not avoid collision with the obstacle.

Such information may be stored in advance in the SCM. For example, the chance of collision with an obstacle or whether a collision with the obstacle occurs according to coordinate information (x, y, θ) of the vehicle is stored in advance so that the chance of collision or whether a collision occurs may be determined based on the previously stored information without needing to be determined in real time.

That is, safety and collision information according to coordination information (x, y, θ) of the vehicle may be stored in advance and utilized as advance information, thereby reducing real-time calculation.

Furthermore, the collision and the safety may be calculated and stored in advance on the basis of speed-added coordinate information (x, y, θ, v). For example, it is determined to be safe only considering (x, y, θ) when a fixed obstacle, such as a wall of a building, is in front of the vehicle driving at a high speed, but by adding the speed component, the situation may be determined as "collision" because collision cannot be avoided even when a brake is rapidly applied. Such information is stored in advance and used as advance information to determine whether a collision occurs according to the state of the vehicle.

In this case, the collision event may be determined as a strong collision event and a weak collision event according to the collision impact of the vehicle and the obstacle, and when a collision with an obstacle is unavoidable, a driving command of the vehicle corresponding to a weak collision event with less impact generated from the collision with the obstacle is caused to be generated first to minimize the collision impact of the vehicle in autonomous drive.

For example, a strong collision event refers to an impact of a vehicle crashing, and a weak collision event refers to a collision of a vehicle lightly bumping or rubbing while colliding with an obstacle.

The information related to the collision state may be determined on the basis of the shape and size of the vehicle and the obstacle, as well as the location of the vehicle and the location of the obstacle. Accordingly, when information about the same region is applied to another vehicle, information about the collision state may be updated on the basis of the shape and size of the corresponding vehicle.

The STM is provided to evaluate the satisfaction and safety of driving during driving of the vehicle as a score and reflect the score in autonomous driving. In this case, the vehicle driving control apparatus obtains coordinate information (x, y, θ, v) of the current position, driving direction, and driving speed of the vehicle, and on the basis of previously stored STM information, determines the autonomous driving score at the current position and the current time according to the coordinate information (x, y, θ, v).

For example, when the driving direction of the vehicle is determined, it is not desirable for the vehicle to travel in reverse, and thus a low score is assigned.

In addition, on the basis of the location of the vehicle, it is not desirable for the vehicle to greatly deviate from the lane, it is not desirable for the vehicle to drive at a speed exceeding the speed limit, and it is not desirable for the vehicle to stop on a crosswalk, intersection, and the like. Such various determination criteria are used to convert coordinate information (x, y, θ, v) of the vehicle into scores, and the scores are stored in advance in the STM and used to immediately determine the score according to the coordinate information of the vehicle.

In addition, the vehicle driving control apparatus 100 may determine the autonomous driving score on the basis of the safety score and the driving satisfaction score according to the coordinate information.

In addition, the vehicle driving control apparatus 100 may determine the autonomous driving score according to a predetermined criterion, for example, on the basis of vibration data, a vehicle speed, and a driving time obtained from a sensor device installed in the vehicle. In addition, the autonomous driving score may be determined by comparing the most preferable advance information for driving. In addition, the autonomous driving score may be directly input from the user.

In this case, when the autonomous driving score is less than or equal to a predetermined score, the vehicle driving control apparatus 100 may change at least one of the driving route, driving direction, and driving speed of the vehicle. Here, the predetermined score is a score in which autonomous driving is performable but the reliability of autonomous driving is in a range of about 60% to 70%, and thus the user's autonomous driving satisfaction is not met when the user's satisfaction is assumed to be a reliability of 80% or higher. The predetermined score may be determined by a user and may be determined according to a predetermined criterion.

In the case of the autonomous driving score not meeting the user's autonomous driving satisfaction, the vehicle driving control apparatus 100 may generate new driving route information by reflecting the surrounding environment information of the vehicle and the state of the vehicle in real time.

In the case of the autonomous driving score less than or equal to a threshold for autonomous driving, the vehicle driving control apparatus 100 may output a warning message. Here, the autonomous driving score less than equal to the threshold represents that the user's reliability on autonomous driving is 40% or less and determines that an error has occurred in the vehicle driving control apparatus 100 or the vehicle that performs autonomous driving.

The vehicle driving control apparatus 100, upon receiving a user input to change to a driving assistance mode after output of the warning message, may change the autonomous driving mode of the vehicle to the driving assistance mode. That is, the autonomous driving mode is terminated, and the vehicle driving control apparatus 100 may simply perform a driving assistance operation.

According to one disclosure, the warning message may include a visual message, an audible message, and a vibrating message and may be output in a manner predetermined by the user.

The vehicle driving control apparatus 100, upon not receiving a user input to change to a driving assistance mode after output of the warning message, may transmit a warning message to a previously registered driver terminal and then generate a driving control command to move the vehicle to a safety area on the basis of the map information. The vehicle driving control apparatus 100 may not automatically terminate the autonomous driving for the safety without receiving an autonomous driving termination input from the user even though the autonomous driving needs to be terminated. Accordingly, the vehicle driving control apparatus 100 may output a warning message to the user terminal or transmit an emergency message to a previously-registered police station server, and the like. Nevertheless, when the vehicle driving control apparatus 100 does not receive a user input for terminating the autonomous driving, the vehicle driving control apparatus 100 allows the vehicle to be moved to a safety area included in the map information to protect the user's safety. The safety area may include the shoulder, a parking lot, and the like and may include areas that do not disturb movement of other vehicles and pedestrians.

Figure 7:
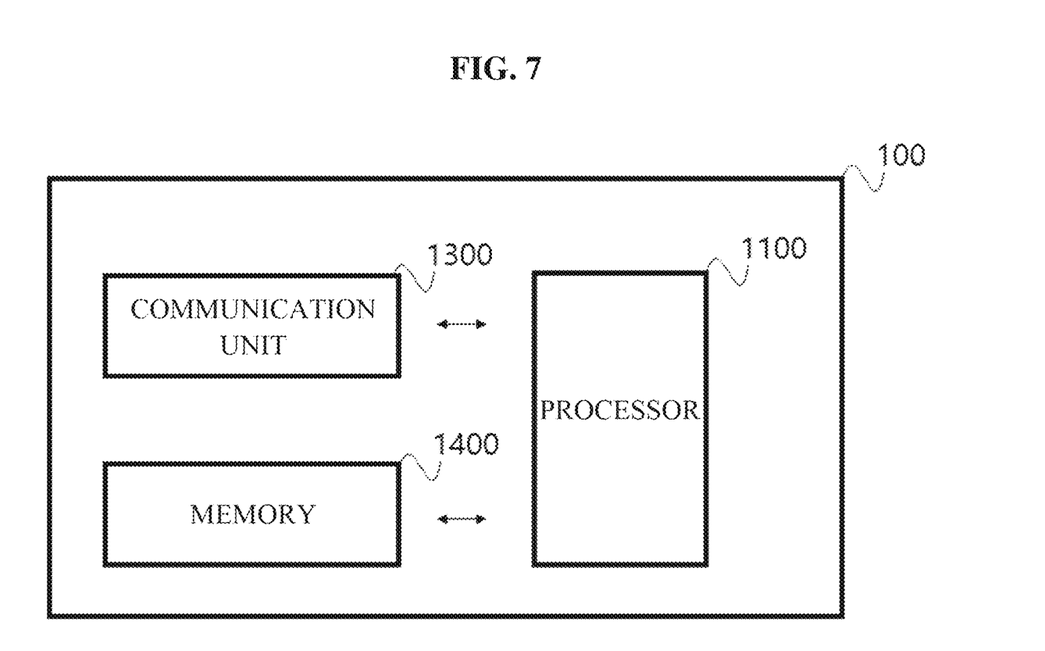
FIG. 7 is a block diagram illustrating a configuration of an apparatus for controlling driving of a vehicle using advance information according to one disclosure.

FIG. 7 is a block diagram illustrating a configuration of an apparatus for controlling driving of a vehicle using advance information according to one disclosure.

A vehicle driving control apparatus 100 according to an embodiment may include a processor 1100, a communication unit 1300, and a memory 1400. However, all of the components shown in FIG. 7 are not essential components of the vehicle driving control apparatus 100. The vehicle driving control apparatus 100 may be implemented by a larger number of components than the components illustrated in FIG. 7, or the vehicle driving control apparatus 100 may be implemented by a smaller number of components than the components illustrated in FIG. 7.

The processor 1100 typically controls the overall operation of the vehicle driving control apparatus 100. For example, the processor 1100 may control the overall operation of the communication unit 1300 and other modules by executing programs stored in the memory 1400. In addition, the processor 1100 may perform functions of the vehicle driving control apparatus 100 by executing programs stored in the memory 1400. The processor 1100 may include at least one processor. The processor 1100 may include a plurality of processors or one processor in an integrated form depending on the function and role thereof. In one embodiment, the processor 1100 may include at least one processor executing at least one program stored in the memory 1400 to provide a notification message.

In one embodiment, the processor 1100 may communicate with other parts installed in the vehicle through the communication unit 1300. For example, the processor 1100 may obtain a driving image including a plurality of frames from a camera installed in a vehicle. In one embodiment, the processor 1100 may transmit a command for controlling the operation of a module installed in the vehicle to the module installed in the vehicle through the communication unit 130 on the basis of the priority of the event through the communication unit 1300.

In one embodiment, the processor 1100 may analyze the driving image to detect an object included in the plurality of frames. In one embodiment, the processor 1100 may recognize location information of an object for each of the plurality of frames using coordinate information.

According to one disclosure, the vehicle driving control apparatus 100 according to the embodiment may further include a sensing unit (not shown), and may acquire sensing information of the vehicle during drive from the sensing unit for detection of an event. For example, the sensing unit includes a geomagnetic sensor, an acceleration sensor, a temperature/humidity sensor, an infrared sensor, a gyroscope sensor, a position sensor (for example, global positioning system: GPS), a barometric pressure sensor, a proximity sensor, and an RGB sensor but is not limited thereto. Since the function of each sensor is intuitively inferred by those skilled in the art from the name of the sensor, detailed descriptions thereof will be omitted.

The communication unit 1300 may include one or more components that allow the vehicle driving control apparatus 100 to communicate with another electronic device (not shown) and the server 2000. Another electronic device (not shown) may be a computing device or a sensing device but is not limited thereto. In addition, another electronic device, for example, may be a module included in the vehicle, such as the vehicle driving control apparatus 100. For example, the communication unit 1300 may include a short-range wireless communication unit, a mobile communication unit, and a broadcast receiving unit.

The short-range wireless communication unit includes a Bluetooth communication unit, a Bluetooth low energy (BLE) communication unit, a near field communication unit, a Wireless Local Area Network (WLAN, Wi-Fi) communication unit, a ZigBee communication unit, an infrared data association (IrDA) communication unit, a Wi-Fi Direct (WFD) communication unit, a ultra-wideband (UWB) communication unit, an Ant+ communication unit, and the like but is not limited thereto.

The mobile communication unit transmits and receives a radio signal to and from at least one of a base station, an external terminal, and a server on a mobile communication network. Here, the radio signal may include various types of data according to transmission and reception of a voice call signal, a video call signal, or a text/multimedia message.

The broadcast receiving unit receives a broadcast signal and/or broadcast-related information from the outside through a broadcast channel. The broadcast channel may include a satellite channel and a terrestrial channel. Depending on an example of implementation, the vehicle driving control apparatus 100 may not include the broadcast receiving unit 1530.

The memory 1400 may store a program for processing and control of the processor 1100 and may store data input to or output from the vehicle driving control apparatus 100.

The memory 1400 may include at least one type of storage medium from among a flash memory type memory, a hard disk type memory, a multimedia card micro type memory, a card type memory (for example, SD or XD memory, etc.), a random access memory (RAM), a static RAM (SRAM), a read-only memory (ROM), an electrically erasable programmable ROM (EEPROM), a programmable ROM (PROM), a magnetic memory, a magnetic disk, and an optical disk.

Programs stored in the memory 1400 may be classified into a plurality of modules according to the functions thereof, for example, into a user interface (UI) module, a touch screen module, a notification module, and the like.

Some embodiments can be embodied in the form of a recording medium that contains therein computer executable instructions, such as a program module that is executed by computers. The computer readable medium can be any available medium that can be accessed by computers and includes all of volatile and nonvolatile media and removable and non-removable media. In addition, the computer readable medium may include all of computer storage media. The computer storage media include all of volatile and nonvolatile media and removable and non-removable media, which are realized by any methods or technologies for storing information, such as computer readable instructions, data structures, program modules or other data.

The term "part" described in the specification refers to a hardware component such as a processor or a circuit and/or a software component to be executed by a hardware component, such as a processor.

The components of the present invention may be implemented as a program (or an application) to be executed in combination with a hardware computer and stored in a medium. The components of the present invention may be implemented in software programming or software components, and similarly, embodiments may be implemented in programming or scripting languages, such as C, C++, Java, assembler, etc., including various algorithms implemented in a combination of data structures, processes, routines or other programming components. Functional aspects may be implemented with algorithms running on one or more processors.

As is apparent from the above, a route is generated using advance information, such as lane information, road attribute information, and speed limit information so that various driving routes can be generated in a short time.

In addition, driving is performed at an optimum speed by reflecting the user experience, such as riding comfort information of the user so that the user's satisfaction can be increased.

In addition, a starting position is connected to a target position through nodes to generate at least one driving route in advance, and the optimal driving route is selected by reflecting obstacle information, road traffic information, and the like so that the driving efficiency can be increased.

The exemplary embodiments of the present invention are illustrative in purpose, and those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. For example, each element described as a single entity may be implemented in a distributed form, and elements described as being distributed may be implemented in a combined form.

The scope of the invention it set forth in the following claims rather than the above specification, and it should be interpreted that all changes or modified forms derived from the meaning and scope of the claims and equivalent concepts thereof are included in the scope of the present invention.

What is claimed is:

1. A method of controlling driving of a vehicle using advance information, the method comprising:
acquiring preset local information about a predetermined region;
acquiring a driving experience value resulting from a previous drive using the local information and setting a target speed corresponding to an attribute of a road using the driving experience value;
determining a driving state and a driving speed of the vehicle on the basis of the local information, and the target speed, of a current position of the vehicle; and
generating a driving control command corresponding to the driving state and the driving speed,
wherein the driving state of the vehicle includes a main driving state and a vehicle lane change driving state, the main driving state includes a basic driving state, which is previously determined based on the attribute of the road, and a sub-driving state, which is not the basic driving state, and the vehicle lane change driving state is determined to change lanes on a driving route,
wherein, when a destination of the vehicle is not set, the vehicle is controlled to drive according to the basic driving state,
wherein control information for the basic driving state includes:
first information that controls the vehicle to drive on a basic driving lane assigned for each of roads in the predetermined region; and
second information that controls the vehicle to drive on a particular direction among a plurality of directions of the basic driving lane when the basic driving lane allows vehicles to drive in the plurality of directions, and wherein the second information includes information for selecting, based on a first default value, one of straight driving and left-turn driving when the vehicle is travelling on a straight and left-turn lane, and includes information for selecting, based on a second default value, one of straight driving and right-turn driving when the vehicle is travelling on a straight and right-turn lane, when information on a particular section, in which a two-lane road is narrowed to a one-lane road, is acquired, obtaining information on a current location of the vehicle; and controlling the vehicle to change a current driving lane of the vehicle before appearance of the particular section;

when a parked vehicle is recognized as a new obstacle, determining a new driving route for avoiding the parked vehicle; and moving to a next lane or moving aside by half of an original lane and then returning to the original lane, wherein the determining the driving state and the driving speed comprises:
  in response to acquiring information on a speed bump on the one-lane road, acquiring information about riding comfort during passing through the speed bump by analyzing vibration data while the vehicle passes the speed bump at different speeds; and determining an optimal speed based on the information about riding comfort, wherein the determining the driving state and the driving speed further comprise:
  receiving a user input to input a destination of the vehicle;
  generating the driving route including a moving route to the destination of the vehicle, the target speed according to the attribute of the road, a lane used in the moving route, whether to change a lane, and whether to control a turn signal lamp of the vehicle; and
  setting, based on map information, the driving route not to turn the turn signal lamp on when the vehicle is driving toward a first road of a five-way intersection, that is recognized as a straight direction in the five-way intersection, and setting, based on the map information, the driving route to turn a left turn signal lamp on when the vehicle is driving toward a second road of the five-way intersection, wherein the generating of the driving control command comprises:
  further storing, in the local information, information on a chance of emergence of a specific moving object in the predetermined region, and information on a type and a weight of a sensor to be used for autonomous driving in the predetermined region;
  determining the type and the weight of the sensor to be used in the predetermined region based on the local information; and
  adjusting a determination result on the specific moving object recognized in the predetermined region, based on the information related to the chance of emergence of the specific moving object in the predetermined region, wherein the acquiring of the local information comprises:
  collecting information constituting the local information through test driving on the road of the predetermined region;
  generating and storing the local information based on the collected information;
  generating the local information by collecting information resulting from the test driving for each vehicle type; and
  newly generating or adjusting the local information for each type of vehicle based on specification information of the vehicle having performed the test driving in consideration of differences from specifications of other types of vehicles, and wherein the collecting of the information comprises:
  collecting information related to the moving object in the predetermined region;
  recognizing an object from a driving image acquired during driving of the vehicle;
  determining the type of the recognized object; and
  determining whether the recognized object is noise on the basis of size information allowed for the type of the object at a position where the recognized object is recognized.

2. The method of claim 1, wherein the target speed is the optimal speed corresponding to the attribute of the road of the predetermined region and determined by analysis of safety driving information and driving comfort information of a driver that are obtained by adjusting the driving speed of the vehicle in a stepwise manner according to the attribute of the road of the predetermined region while driving on the road of the predetermined region.

3. The method of claim 1, wherein the attribute of the road includes at least one of a number of lanes, a stop line, a crosswalk, a speed limit, an intersection, a U-turn, a road entry/exit point, a road junction, a road fork, a building access road, the speed bump, and a protected area of the road.

4. The method of claim 1, wherein the basic driving state is one selected from straight driving, left-turn driving and right-turn driving with respect to each road of the predetermined region,
  wherein the driving state of the vehicle is primarily determined as the basic driving state set in the road on the basis of the attribute of the road where the vehicle is currently located, and
  when the driving control command for requesting the sub-driving state is generated, the driving state of the vehicle is determined as the sub-driving state.

5. The method of claim 1, further comprising:
  recognizing a new obstacle on a first driving route being travelled on by the vehicle;
  acquiring a grid map displaying a position to which the vehicle is movable and a new obstacle located around the vehicle with respect to a current position of the vehicle;
  acquiring a plurality of driving routes, in which the vehicle is movable, on the basis of the grid map;
  selecting a second driving route that is one of the plurality of driving routes; and
  generating a driving control command of the vehicle corresponding to the second driving route.

6. The method of claim 1, wherein the local information includes information related to a traffic signal,
  the information related to the traffic signal includes traffic light information related to a number, a status, a location, a form, and an operation method of traffic lights installed in the predetermined region, and
  the driving state and the driving speed of the vehicle are determined using the traffic light information acquired at the current position of the vehicle.

7. The method of claim 1, comprising:
acquiring the current position and a driving direction of the vehicle as coordinate information (x, y, θ);
acquiring information related to a chance of colliding with an obstacle according to the coordinate information (x, y, θ) from the local information;
determining a safety event when it is determined that the vehicle avoids collision with the obstacle, and determining a collision event when it is determined that the vehicle does not avoid collision with the obstacle; and
generating a driving command of the vehicle corresponding to the determined event.

8. The method of claim 7, wherein the collision event is determined as a strong collision event or a weak collision event according to a collision impact between the vehicle and the obstacle, and
when the collision with the obstacle is unavoidable, the driving command of the vehicle corresponding to the weak collision event is primarily generated in which an impact generated from the collision with the obstacle is small.

9. The method of claim 1, further comprising:
acquiring the current position, a driving direction, and a driving speed of the vehicle as coordinate information (x, y, θ, v);
determining an autonomous driving score at the current position and a current time according to the coordinate information (x, y, θ, v) on the basis of information stored in advance in the local information; and
when the autonomous driving score is less than or equal to a predetermined score, changing at least one of a driving route, the driving direction, and the driving speed of the vehicle.

10. The method of claim 9, further comprising:
outputting a warning message when the autonomous driving score is less than or equal to an autonomous driving threshold;
changing an autonomous driving mode of the vehicle to a driving assistance mode upon receiving a user input to change to the driving assistance mode after the outputting of the warning message; and
transmitting the warning message to a previously registered user terminal and generating a driving control command to move the vehicle to a safety region on the basis of the local information upon not receiving the user input to change to the driving assistance mode after the outputting of the warning message.

11. An apparatus comprising:
a memory in which one or more instructions are stored; and
a processor configured to execute the one or more instructions stored in the memory,
wherein the processor executes the one or more instructions to perform the method of claim 1.

12. A non-transitory computer readable storage medium storing instructions/program which, when executed by a hardware computer, cause the computer to carry out the method of claim 1.

* * * * *